United States Patent [19]

Kawase et al.

[11] Patent Number: 5,723,170
[45] Date of Patent: Mar. 3, 1998

[54] METHOD OF FORMING FLUORESCENT SCREEN OF CATHODE RAY TUBE

[75] Inventors: Saori Kawase; Hiroshi Kato; Tsuyoshi Kaneko, all of Kanagawa, Japan

[73] Assignee: Sony Corporation, Japan

[21] Appl. No.: 665,442

[22] Filed: Jun. 18, 1996

[30] Foreign Application Priority Data

Jun. 21, 1995 [JP] Japan ................. 7-154802

[51] Int. Cl.$^6$ ................................. B05D 5/12
[52] U.S. Cl. ................ 427/64; 427/68; 427/73; 427/165; 427/126.2; 427/123; 427/126.3; 427/226; 427/230; 427/389.7; 427/404; 427/407.2; 427/419.2; 427/444; 427/336; 427/83.1
[58] Field of Search ............. 427/64, 68, 123, 427/126.2, 126.3, 105, 73, 383.1, 226, 230, 389.7, 404, 407.2, 419.2, 444, 336

[56] References Cited

U.S. PATENT DOCUMENTS

| | | | |
|---|---|---|---|
| 5,208,065 | 5/1993 | Osaka et al. | 427/64 |
| 5,334,410 | 8/1994 | Beckerle et al. | 427/64 |
| 5,366,759 | 11/1994 | Beckerle et al. | 427/64 |
| 5,435,938 | 7/1995 | Bando et al. | 427/64 |

*Primary Examiner*—Janyce Bell
*Attorney, Agent, or Firm*—Ronald P. Kananen

[57] ABSTRACT

A method of forming a phosphor layer of a fluorescent screen of a CRT, having a good screen quality by properly managing the dissolution of a water glass and barium acetate occurring in a covering water step and improve the uniformity. A phosphor layer is formed on an inner surface of a panel portion of a glass bulb by a precipitation process and a lacquer intermediate film is formed on the phosphor layer in a state where the phosphor layer is moistened by covering water. An electrolyte remaining in the phosphor layer after the phosphor layer is moistened by the covering water has a conductivity of $6.0 \pm 4.0$ μs/cm in 200 ml of pure water of $20°$ C.$\pm 1°$ C.

13 Claims, 3 Drawing Sheets

METHOD OF FORMING FLUORESCENT SCREEN OF CATHODE RAY TUBE

BACKGROUND INVENTION

1. Field of the Invention

The present invention relates to a method of producing a cathode-ray tube, more particularly relates to a method of forming a fluorescent screen of a cathode ray tube in which improves a process of pouring covering water performed between a process of forming a phosphor layer by a precipitation process and a process of forming a lacquer intermediate film.

2. Description of the Related Art

A cathode ray tube (CRT) is provided with a glass bulb comprising a panel portion, a funnel portion, and a neck portion and is configured so that a phosphor layer formed on an inner surface of the panel portion is irradiated by electrons from an electron gun to cause the phosphor to emit light.

This type of cathode ray tube, for example, a cathode ray tube for a projection television or a cathode ray tube for a monochrome television, is produced in, for example, the following way.

First, the inner surface of the glass bulb on which the phosphor layer is formed is washed by using pure water etc., then an aqueous electrolyte solution such as an aqueous solution of barium acetate is poured, then a suspension obtained by dispersing the phosphor in an aqueous solution of water glass is poured in as a binder and the assembly is allowed to stand for a predetermined time to cause the phosphor to precipitate. After the precipitation of the phosphor, the glass bulb is slowly moved and inclined (tilted) so as to form the phosphor layer.

Next, in order to form a continuous good aluminum vapor deposited film, the phosphor layer is moistened by pure water or the like, the majority of the phosphor layer is covered by a film of the water, then an organic solvent lacquer mainly composed of an acrylic resin is sprayed to form a very thin lacquer intermediate film on the film of water. The phosphor layer is not formed on the inner surface of the funnel portion and neck portion, so the lacquer intermediate film formed on the portion is removed by pouring pure water. This is because, when the lacquer intermediate film is formed in a region not coated with the phosphor layer, the aluminum vapor deposited film formed on this region swells by the subsequent baking step and peeling is caused from the funnel portion of the cathode ray tube.

Further, the phosphor layer is dried by using dehumidified air etc. and a carbon film is coated on the predetermined region and dried. Finally, the aluminum is vapor deposited to form the aluminum vapor deposited film, then the organic material used when forming the phosphor layer is heated to 400° to 440° C. to decompose and remove it. The phosphor layer is formed after these steps.

In the above-mentioned method of producing a cathode ray tube, in the process of pouring the covering water carried out before forming the lacquer intermediate film after forming the phosphor layer, the water glass and barium acetate are dissolved in the covering water. If the amount of the water glass and barium acetate dissolved in the covering water is too small, however, the luminance deteriorates at the peripheral portions of the screen due to aging after fabrication of the CRT due to the influence of the water glass and barium acetate remaining in the phosphor layer. This disadvantage is conspicuous in a blue monochrome projection cathode ray tube and causes a disadvantage in that the peripheral portions become yellow when an RGB projection cathode ray tube is used and a white color is projected.

Conversely, when the amount of the water glass and barium acetate dissolved in the covering water is too large, a sufficient bonding force of the phosphor to the glass surface cannot be obtained and it suffers from the disadvantage in that the phosphor drops off due to vibration during the fabrication of the CRT. After pouring in a cushion solution and suspension, the phosphor is precipitated by the reaction of the barium acetate in the cushion solution and the water glass in the suspension. When the amount of the water glass is insufficient or the amount of barium acetate becomes excessive or insufficient with respect to the water glass, the bonding force of the phosphor is lowered, and the phosphor will be flushed away at the time of the discharge of the water.

The dried phosphor is adhered to the panel glass by the water glass. For this reason, when the amount of the water glass is too small, the phosphor becomes apt to peel off due to the lowering of the bonding force with the panel glass. Conversely, if it is too large, burning occurs with aging after the fabrication of the CRT. This becomes a cause of the lowering of the luminance.

SUMMARY OF THE INVENTION

The present invention was made in consideration with such disadvantages and has as an object thereof to provide a method of producing a cathode ray tube which forms a phosphor layer having a good surface quality by properly managing the dissolution of the water glass and barium acetate occurring in the covering water step and can improve the uniformity.

According to the present invention, there is provided a method of forming a fluorescent screen for a cathode ray tube having a glass bulb, comprising the steps of: cleaning an inner surface of the glass bulb having a panel portion by using at least pure water; injecting an aqueous solution of electrolyte into the glass bulb; depositing a suspension of water glass and phosphor slurry on an inner surface of the panel portion; drying the suspension to form a phosphor layer; coating a whole surface of the phosphor layer with pure water from 30 to 180 seconds; spraying a lacquer comprising an acrylic resin on the wetted phosphor layer to form a lacquer film layer; forming a metal backing layer on the lacquer film layer; and heating the glass bulb to remove the lacquer film layer at a temperature at 400° C. to 420° C.

Preferably, the cleaning process comprises the step of cleaning the inner surface of the glass bulb by using an aqueous solution of fluorhydric acid before using the pure water, or the step of cleaning the inner surface of the glass bulb by using nitric acid before using the pure water.

Preferably, the aqueous solution of electrolyte comprises an aqueous solution of barium acetate.

Preferably, the drying process is drying the suspension by using dehumidified air.

Preferably, the coating process includes the step of coating a whole surface of the phosphor layer with pure water for 40 to 150 seconds or the step of coating process includes the step of coating a whole surface of the phosphor layer with pure water for 80 to 120 seconds.

BRIEF DESCRIPTION OF THE DRAWINGS

The above and other objects and features of the present invention will be apparent from the following description with reference to the accompanying drawings in which.

DESCRIPTION OF THE PREFERRED EMBODIMENTS

Below, an explanation will be made of an embodiment of the present invention based on the drawings.

Figure 1:
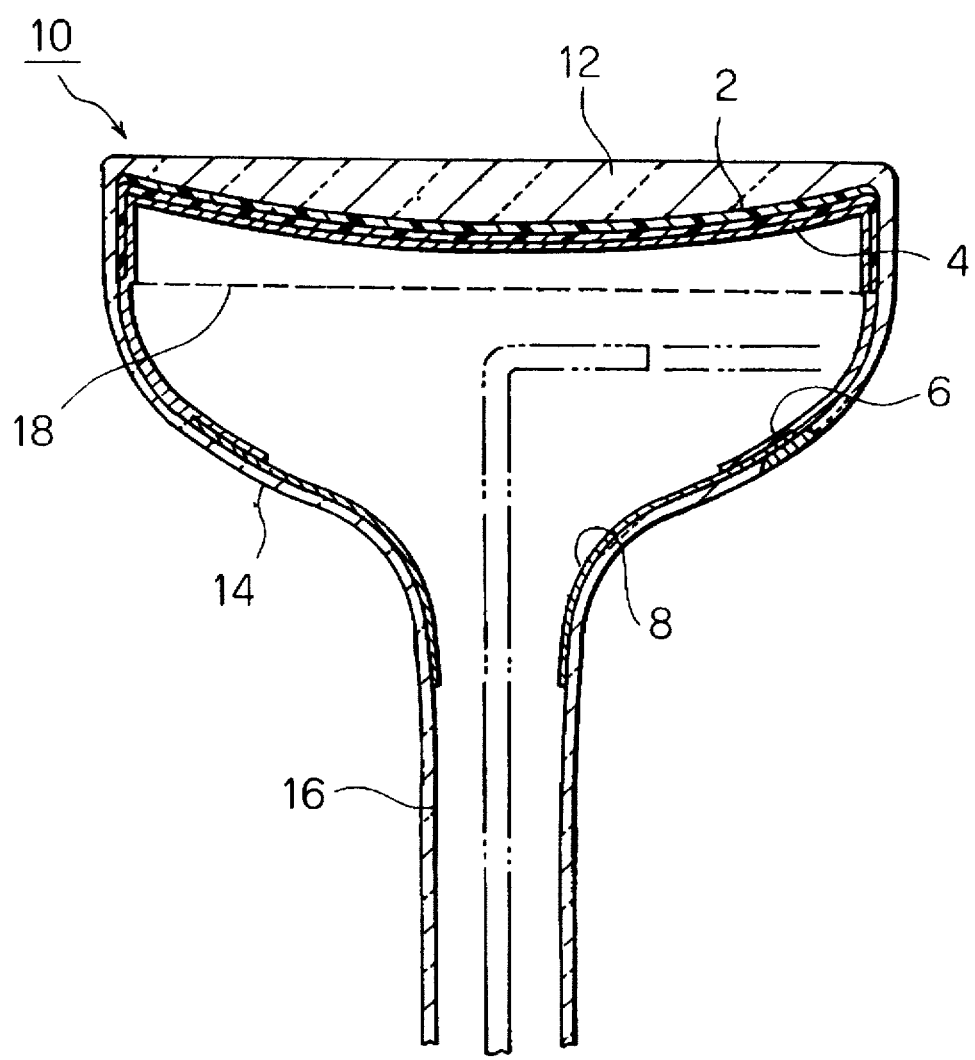
FIG. 1 is a sectional view of a cathode ray tube according to an embodiment of the present invention.

A cathode ray tube (CRT) to which the present embodiment is applied is a CRT used in, for example, a projection television or a monochrome television such as a black and white television. As shown in FIG. 1, the CRT has a glass bulb 10 comprising a panel portion 12, a funnel portion 14, and a neck portion 16 and is configured so that a phosphor layer 2 formed on the inner surface of the panel portion 12 is irradiated by electrons from an electron gun (not illustrated) to cause the phosphor included in the phosphor layer 2 to emit light.

On the inner surface of the panel portion 12, the phosphor layer 2 containing the phosphor is formed. A lacquer intermediate film 4 is formed on the front surface of this phosphor layer 2. The lacquer intermediate film 4 is constituted by a organic solvent lacquer comprised mainly of an acrylic resin which is dissolved into organic solvent such as toluene. By interposing a very thin lacquer intermediate film 4 between the phosphor layer 2 and an aluminum vapor deposited film 6, a continuous, good aluminum vapor deposited film 6 can be obtained. This lacquer intermediate film 4 is formed up to a connection portion 18 of the panel portion 12 and the funnel portion 14 so as to cover at least the phosphor layer 2.

On a predetermined region of the inner surface of the funnel portion 14, a carbon film 8 for conduction is formed. Further, on the inner surface of the panel portion 12 and the funnel portion 14, an aluminum vapor deposited film 6 is formed for the purpose and for the prevention of ion burning of the phosphor due to the electron beam, of increase of the light emission efficiency, etc.

Figure 2:
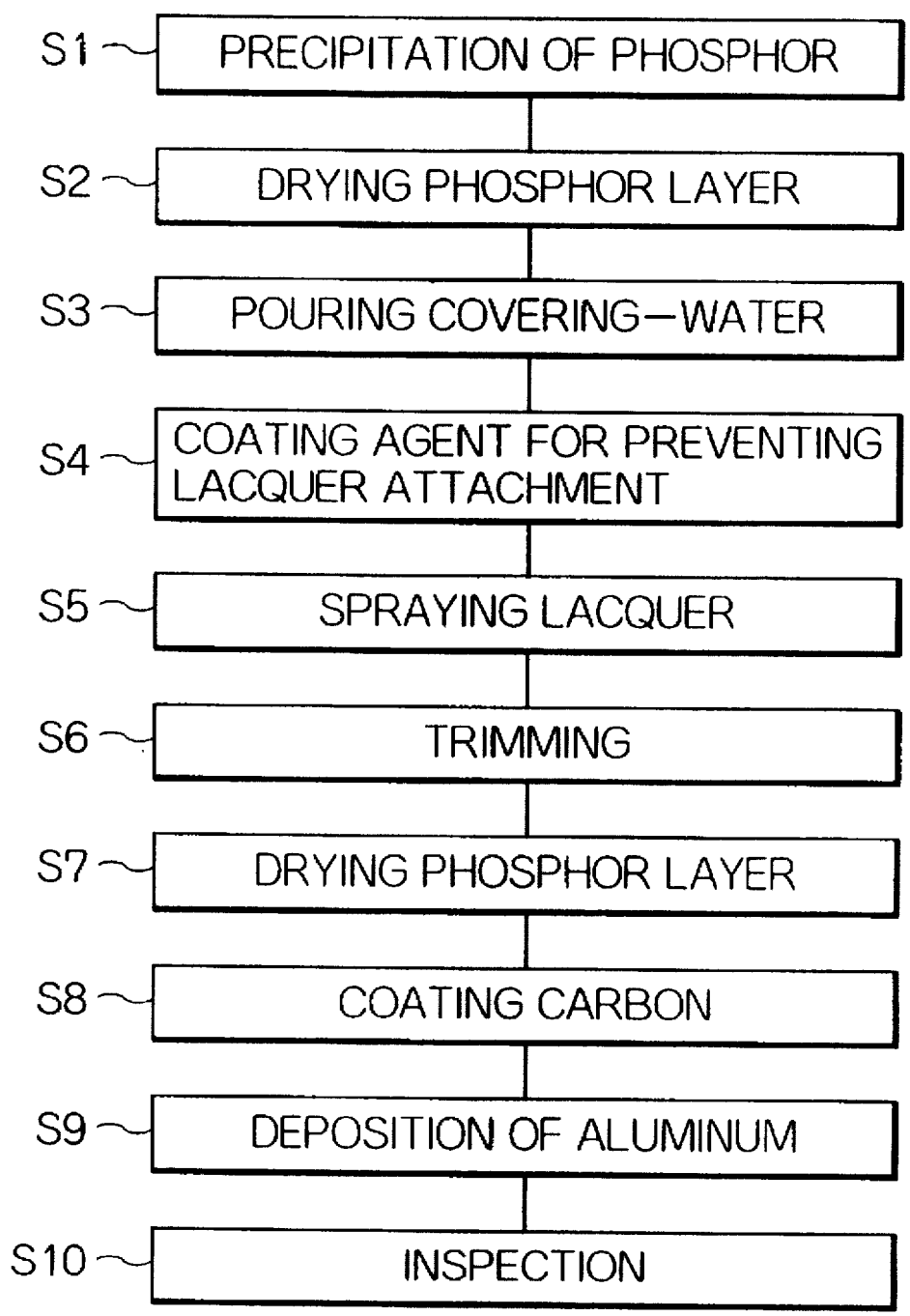
FIG. 2 is a flowchart of the method of producing a cathode ray tube according to an embodiment of the present invention.

An explanation will be made of the method of producing a cathode ray tube according to the present embodiment referring to FIG. 2.

The inner surface of the glass bulb 10 forming the phosphor layer 2 is washed (cleaned) by using an aqueous solution of hydrofluoric acid, an aqueous solution of nitric acid, and pure water. Subsequently, the panel portion 12 of the glass bulb 10 is turned downward, and a predetermined amount of an aqueous electrolyte solution such as an aqueous solution of barium acetate is poured (injected) into the glass bulb 10. Thereafter, a suspension obtained by dispersing a predetermined phosphor is poured (injected) into an aqueous solution of water glass serving as a binder and the assembly is allowed to stand for a predetermined time to cause the phosphor to precipitate (step 1: S1). After the precipitation of the phosphor, the glass bulb is slowly moved and inclined, to thereby form the phosphor layer 2. In this case, the drying of the phosphor layer 2 is carried out by vacuum drying etc (step 2:S2).

Figure 4:
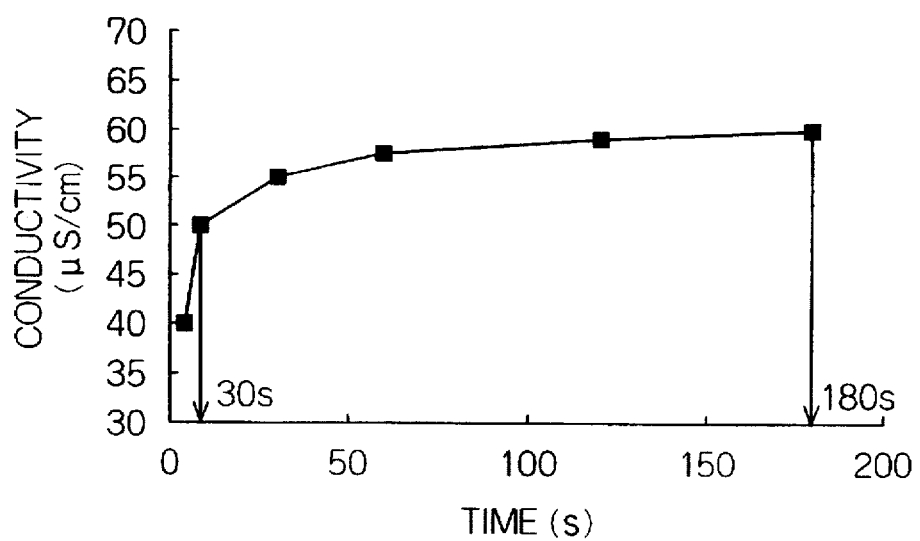
FIG. 4 is a graph of the conductivity of covering water with respect to the time of moistening by the covering water.

Subsequently, so as to form a continuous, good aluminum vapor deposited film 6, first the phosphor layer 2 is moistened by pure water (covering water) etc. and the whole surface of the phosphor layer 2 is covered by a film of water (step 3:S3). The agent (liquid) for preventing adhesion of the lacquer on the inner surface of the funnel 14, is coated below the connection portion 18 of the panel 12 and the funnel 14 and on the neck 16 (step 4:S4). At this time, the barium acetate and the water glass contained in the phosphor layer 2 are dissolved in the pure water, so the electric conductivity in the covering water is increased along with an increase of the time of moistening by the pure water as shown in FIG. 4. In the present embodiment, by managing the conductivity in the covering water in this covering water pouring process, the production of the best cathode ray tube is made possible. Namely, according to a study by the present inventors, the best cathode ray tube can be obtained when the conductivity of the electrolyte remaining in the phosphor layer after the covering water pouring process (injection process) is 6.0±4.0 μs/cm in 200 ml of pure water of 20° C.±1° C. Accordingly, the moistening time was set so that the conductivity of the electrolyte remaining in the phosphor layer in the covering water pouring process satisfied the above conductivity range. Specifically, as shown in FIG. 4, the covering water pouring process was carried out by pure water for 30 to 180 seconds.

Figure 3:
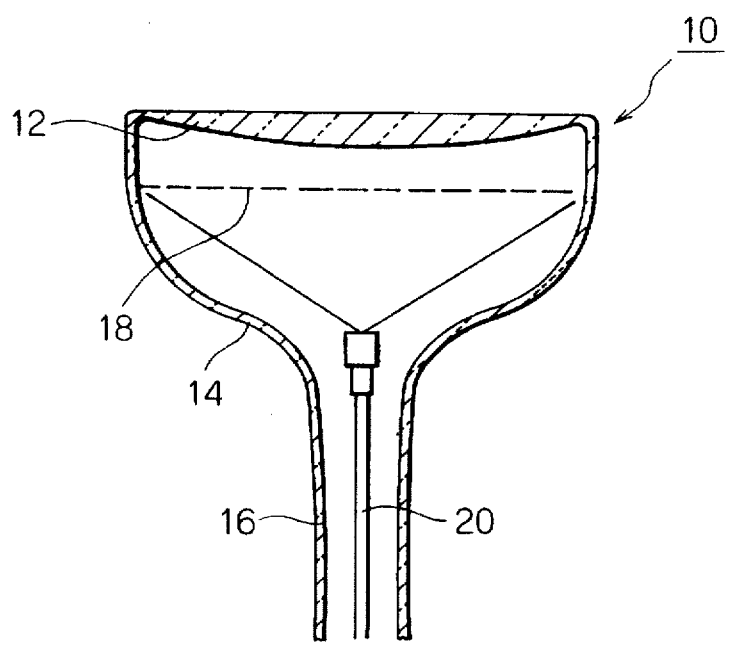
FIG. 3 is a sectional view of a cathode ray tube showing a lacquer spraying step according to an embodiment of the present invention.

The panel portion 12 of the glass bulb 10 is turned upward as shown in FIG. 3 and an organic solvent lacquer mainly composed of an acrylic resin is sprayed to the inner surface of the panel portion 12 and the funnel portion 14 by using a nozzle 20 (step 5:S5) so as to form a very thin lacquer intermediate film 4 on the film of water.

Since if the lacquer intermediate film 4 were formed on a region on which the phosphor layer 2 was not coated, the aluminum vapor deposited film 6 deposited on this region by vapor deposition would blister in the baking process after this and peel from the funnel portion 14 of the cathode ray tube, as indicated by two dot chain line in FIG. 1, the lacquer intermediate film 4 from the funnel portion 14 to the neck portion 16 on which the phosphor layer 2 is not formed is removed by spraying pure water (trimming step 6:S6).

The phosphor layer 2 is dried by using dehumidified air etc. (step 7:S7), the carbon for conduction is coated on a predetermined region of the inner surface of the glass bulb 10 and dried to form the carbon film 8 (step 8:S8).

The aluminum is vapor deposited on the phosphor layer 2 to form the aluminum vapor deposited film 6, then the organic material used when forming the phosphor layer 2 is heated to 400° to 420° C. to decompose and remove it (step 9:S9).

Finally, the inspection of the formed fluorescent screen of the CRT is carried out.

As mentioned above, in the present invention, a phosphor layer is formed on an inner surface of a panel portion of a glass bulb by a precipitation process and a lacquer intermediate film is formed on the phosphor layer in a state where the phosphor layer is moistened by covering water, characterized in that after the phosphor layer is moistened by the covering water, an electrolyte remaining in the phosphor layer has a conductivity of 6.0±4.00 μs/cm in 200 ml of pure water of 20° C.±1° C. The phosphor layer is preferably moistened by the covering water for 30 to 180 seconds.

In the method of producing a cathode ray tube of the present invention, first a phosphor layer is formed on the inner surface of the panel portion of the glass bulb by a precipitation process and a lacquer intermediate film is formed on the phosphor layer in a state where the phosphor layer is moistened by covering water. At the moistening of the phosphor layer formed on the inner surface of this panel portion by covering water such as pure water, in the method of producing a cathode ray tube of the present invention, the electrolyte remaining in the phosphor layer after moistening the phosphor layer by the covering water is given a conductivity of 6.0±4.0 µs/cm in 200 ml of pure water of 20° C.±1° C. Namely, the amount of the electrolyte dissolved in the covering water is maintained in a proper range. As a result, the deterioration of the luminance of the peripheral portions of the screen after the fabrication of the CRT due to the shortage of the amount of dissolution of the electrolyte, in other words, the residual presence of a large amount of the electrolyte in the phosphor layer, can be prevented. Also, the detachment of the phosphor due to an excessive amount of dissolution of the electrolyte, in other words, a shortage of the electrolyte remaining in the phosphor layer, can be prevented.

Particularly the amount of the electrolyte contained in the phosphor layer dissolved in the covering water is correlated with the time of moistening with the covering water, therefore when the change of the conductivity of the electrolyte remaining in the phosphor layer with respect to the time of moistening by the covering water is preliminarily measured and the conductivity is managed by a moistening time (for example 30 to 180 seconds) satisfying the conductivity of 6.0±4.0 µs /cm with which the screen quality becomes the best, the management of production of the cathode ray tube becomes easier.

In the cathode ray tube produced after passing the above steps, the luminance was improved by about 10 percent compared with a conventional cathode ray tube.

Note that, the present invention is not limited to the above embodiment and includes various modifications within the scope of the present invention.

What is claimed is:

1. A method of forming a fluorescent screen for a cathode ray tube having a glass bulb, comprising the steps of:

cleaning an inner surface of the glass bulb having a panel portion by using at least pure water;

injecting an aqueous solution of electrolyte into the glass bulb;

depositing a suspension of water glass and phosphor slurry on an inner surface of the panel portion;

drying the suspension to form a phosphor layer;

coating a whole surface of the phosphor layer with pure water from 30 to 180 seconds;

spraying a lacquer comprising an acrylic resin on the wetted phosphor layer to form a lacquer film layer;

forming a metal backing layer on the lacquer film layer; and heating the glass bulb to remove the lacquer film layer at a temperature at 400° C. to 420° C.

2. A method of forming a fluorescent screen for a cathode ray tube according to claim 1, wherein said cleaning process comprises the step of cleaning the inner surface of the glass bulb by using an aqueous solution of hydrofluoric acid before using the pure water.

3. A method of forming a fluorescent screen for a cathode ray tube according to claim 1, wherein said cleaning process comprises the step of cleaning the inner surface of the glass bulb by using nitric acid before using the pure water.

4. A method of forming a fluorescent screen for a cathode ray tube according to claim 1, wherein said aqueous solution of electrolyte comprises an aqueous solution of barium acetate.

5. A method of forming a fluorescent screen for a cathode ray tube according to claim 1, wherein said drying process is drying the suspension by using dehumidified air.

6. A method of forming a fluorescent screen for a cathode ray tube according to claim 1, wherein said coating process includes the step of coating a whole surface of the phosphor layer with pure water for 40 to 150 seconds.

7. A method of forming a fluorescent screen for a cathode ray tube according to claim 1, wherein said coating process includes the step of coating a whole surface of the phosphor layer with pure water for 80 to 120 seconds.

8. A method of forming a fluorescent screen for a cathode ray tube according to claim 1, wherein said glass bulb comprises a panel portion, a funnel portion and a neck portion and said step of depositing is performed such that said phosphor layer is formed exclusively on said panel portion.

9. A method of forming a fluorescent screen for a cathode ray tube according to claim 1, wherein said glass bulb comprises a panel portion, a funnel portion and a neck portion and said step of spraying is performed such that said lacquer thin film is formed over said phosphor layer on said panel portion and said lacquer ends at a boundary between said panel portion and said funnel portion.

10. A method of preparing a phosphor layer on a surface of a glass bulb to receive a metal backing layer thereon to form a fluorescent screen for a cathode ray tube comprising coating an entire surface of a dried phosphor layer with water for 30 to 180 seconds prior to forming a metal backing layer on said phosphor layer, where, during said coating, water glass and an electrolyte, which are both constituents of said phosphor layer, dissolve in said water.

11. A method of preparing a phosphor layer according to claim 10, wherein said phosphor layer is coated with water for 40 to 150 seconds.

12. A method of preparing a phosphor layer according to claim 11, wherein said phosphor layer is coated with water for 80 to 120 seconds.

13. A method of preparing a phosphor layer on a surface of a glass bulb to receive a metal backing layer thereon to form a fluorescent screen for a cathode ray tube, comprising dissolving an electrolyte constituent of said phosphor layer by applying a film of water to an entire surface of said phosphor layer, said dissolving continuing until a conductivity of the electrolyte remaining in the phosphor layer is 6.0±4 µs/cm in 200 ml of pure water at 20° C.±1° C.

* * * * *